Patented Dec. 22, 1953

2,663,645

UNITED STATES PATENT OFFICE 2,663,645

METHOD OF TREATING POPCORN

Robert Park, Cohasset, Minn.

No Drawing. Application March 3, 1951,
Serial No. 213,799

2 Claims. (Cl. 99—81)

My invention relates to the treatment of unpopped corn and, more particularly, to the novel method of dyeing the kernels of the corn.

I have found that unpopped corn dyed in various hues and colors is highly attractive and much more merchandisable than is conventional undyed corn. I have also discovered that, due to the fact that the hulls or shells of the kernels of the corn are high in oil content, dyes are neither uniformly nor permanently absorbed by said hulls. The primary object of my invention is the provision of a novel process of treating the kernels of corn, whereby a desired hue or color may be imparted thereto uniformly and permanently.

A still further object of my invention is the provision of a process for imparting color to the kernels of unpopped pop corn which may be performed in a quick and inexpensive manner and which will result in all of the kernels thereof being of uniform moisture content within a desired range.

A still further object of my invention is the provision of a method of dyeing corn which makes possible the rejuvenation of kernels of corn, the moisture content of which has been allowed to drop below the minimum point required for popping purposes.

The above and still further objects of my invention will become apparent from the following detailed description and appended claims.

The first step in my novel process is the preparation of an aqueous bath or solution of non-toxic vegetable or coal tar dye of a desired color, a non-toxic grease-cutting agent and pure distilled water. The grease-cutting agent may well be any one of the well-known detergents, containing at least ten per cent of sodium lauryl sulphate. The approximate proportions of the above ingredients are as follows, to wit: one gallon of distilled water, ½ to one ounce of commercial detergent (containing at least ten per cent sodium lauryl sulphate), and three to four ounces of dry dye powder. The dry powder may be any one of the well-known commercially produced dyes, which are from thirty-five to fifty per cent pure coloring.

Into the above bath or solution, an indefinite amount of any type of pop corn kernels may be placed. Preferably, the kernels are submerged in this solution, although satisfactory results may be obtained by otherwise exposing the kernels to the solution, such as by spraying them or running them through sponge rollers or the like. In any event, the solution or bath should be maintained as close as possible to 212 degrees Fahrenheit at the time the kernels are treated with it.

Exposure of the kernels to the solution varies depending upon the particular hue desired and the particular method of exposure utilized, to wit: submergence, spraying, etc.; however, in the event that the preferred method of submerging the same into the solution is utilized, I have found that a period of two minutes duration achieves satisfactory results.

After the kernels have been dyed to the desired hue, they are removed from the dye solution (or otherwise removed from exposure to said dye solution) and washed or rinsed thoroughly with a spray or shower of clean preferably hot water until no traces of free dye remain. These kernels are then allowed to drain thoroughly.

The next step in my novel process, as preferably performed, is the drying of the damp kernels in any style or type of mechanical dryer, whereby to reduce the moisture content of all the kernels thereof uniformly to a ten to fifteen per cent level in as short a time as possible without injury of any kind to the kernels by cooking, abrasion, or the like.

Finally, the kernels, dryed as above provided, are allowed to sit or age for a period of time ranging from several days to several weeks, so as to allow for an evening out or complete utilization or uniform distribution of all the moisture in the corn, throughout all the kernel structure.

I have found that, by the above process, not only is the desired color and hue imparted to the kernels of corn, but also that all loose dirt particles are removed therefrom during the several baths or washings. Furthermore, submerging or otherwise exposing the kernels to hot water on two separate occasions has a sterilizing effect upon the same. However, perhaps the greatest indirect benefit resulting from my novel dyeing process is the controlled standardization of moisture in the several kernels, whereby best popping may be obtained.

Having described my novel process, what I claim is:

1. The method of treating unpopped corn kernels which comprises preparing an aqueous solution containing a non-toxic oil solvent and a non-toxic dye, heating said solution to approximately its boiling point, exposing said kernels to said solution, then washing said kernels with water until no traces of dye remain, draining said kernels, drying said damp kernels until the moisture content thereof is reduced to a predetermined percentage, and finally aging said kernels.

2. The method of treating unpopped corn kernels which comprises preparing an aqueous solution containing a non-toxic oil solvent and a non-toxic dye, heating said solution to approximately its boiling point, submerging said kernels in said solution for a period of approximately two minutes, then washing said kernels with hot water until no traces of free dye remain, draining the kernels so washed, drying the damp kernels until the moisture content thereof is reduced to ten to fifteen percent, and finally aging the kernels for a period of time ranging from several days to several weeks to even out or standardize the moisture content of the treated kernels.

ROBERT PARK.

References Cited in the file of this patent

UNITED STATES PATENTS

| Number | Name | Date |
|---|---|---|
| 2,062,903 | Handy | Dec. 1, 1936 |
| 2,518,247 | Nairn | Aug. 8, 1950 |

FOREIGN PATENTS

| Number | Country | Date |
|---|---|---|
| 155,724 | Great Britain | of 1920 |